US012431311B2

(12) United States Patent
Xu et al.

(10) Patent No.: US 12,431,311 B2
(45) Date of Patent: Sep. 30, 2025

(54) ANTI-REBOUND PROTECTION DEVICE AND CIRCUIT BREAKER COMPRISING THE SAME

(71) Applicant: Hitachi Energy Ltd, Zürich (CH)

(72) Inventors: Chao Xu, Beijing (CN); Hua Zhao, Beijing (CN); Yu Guan, Beijing (CN)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/873,605

(22) PCT Filed: Feb. 24, 2023

(86) PCT No.: PCT/EP2023/054751
§ 371 (c)(1),
(2) Date: Dec. 10, 2024

(87) PCT Pub. No.: WO2023/241832
PCT Pub. Date: Dec. 21, 2023

(65) Prior Publication Data

US 2025/0166953 A1 May 22, 2025

(30) Foreign Application Priority Data

Jun. 15, 2022 (CN) ......................... 202210678538.2

(51) Int. Cl.
*H01H 71/50* (2006.01)
*H01H 3/42* (2006.01)

(52) U.S. Cl.
CPC ............ *H01H 71/504* (2013.01); *H01H 3/42* (2013.01)

(58) Field of Classification Search
CPC ........ H01H 71/504; H01H 3/42; H01H 71/10; H01H 3/60; H01H 9/20; H01H 1/50; H01H 33/666
See application file for complete search history.

(56) References Cited

U.S. PATENT DOCUMENTS 4,263,492 A * 4/1981 Maier .................. H01H 71/504 200/323
4,611,187 A * 9/1986 Banfi .................. H01H 77/104 335/46
4,612,430 A * 9/1986 Sloan .................. H01H 71/504 200/325
(Continued)

FOREIGN PATENT DOCUMENTS

CA 2214541 A1 3/1998
CN 207183155 U 4/2018
(Continued)

OTHER PUBLICATIONS

International Search Report and Written Opinion of the International Searching Authority, International Application Np. PCT/EP/2023/054751, mailed Jun. 6, 2023, 13 pages.

*Primary Examiner* — Edwin A. Leon
(74) *Attorney, Agent, or Firm* — Sage Patent Group

(57) ABSTRACT

An anti-rebound protection device and a circuit breaker comprising the same is disclosed. The anti-rebound protection device for the circuit breaker includes an operating mechanism. The operating mechanism of the circuit breaker includes a housing, a main shaft arranged in the housing, and an output lever connected to the main shaft. The anti-rebound protection device includes a control cam; a control lever being rotatable relative to the housing, and provided with a first stopper for abutting against the control cam; and a locking mechanism comprising a locking member rotatably connected to the output lever and a second stopper provided on the control lever.

9 Claims, 7 Drawing Sheets

(56) References Cited

U.S. PATENT DOCUMENTS

| | | | | | |
|---|---|---|---|---|---|
| 4,679,018 | A * | 7/1987 | McKee | H01H 71/1054 335/22 |
| 4,713,503 | A * | 12/1987 | Kamp | H01H 33/666 218/140 |
| 4,855,549 | A * | 8/1989 | Toda | H01H 77/104 335/16 |
| 5,743,385 | A * | 4/1998 | Godesa | H01H 71/504 200/400 |
| 5,912,605 | A * | 6/1999 | Eberts | H01H 77/104 335/16 |
| 6,084,489 | A * | 7/2000 | Castonguay | H01H 77/104 335/16 |
| 6,316,739 | B1 * | 11/2001 | Ohtsuka | H01H 3/30 200/501 |
| 6,831,240 | B2 * | 12/2004 | Bach | H01H 71/504 200/400 |
| 9,208,962 | B2 | 12/2015 | Bose et al. | |
| 9,466,441 | B2 | 10/2016 | Jurek et al. | |
| 2010/0230261 | A1 | 9/2010 | Kim | |

FOREIGN PATENT DOCUMENTS

| | | | |
|---|---|---|---|
| CN | 109427504 | A | 3/2019 |
| CN | 110323108 | A | 10/2019 |
| DE | 102020204275 | B3 | 10/2021 |
| EP | 2015331 | A2 | 1/2009 |
| GB | 2032693 | A | 5/1980 |
| JP | 3669225 | B2 | 7/2005 |
| WO | 0227743 | A1 | 4/2002 |

* cited by examiner

ANTI-REBOUND PROTECTION DEVICE AND CIRCUIT BREAKER COMPRISING THE SAME

CROSS REFERENCE TO RELATED APPLICATIONS

This application is a 35 U.S.C. § 371 national stage application of PCT International Application No. PCT/EP2023/054751 filed on Feb. 24, 2023, which in turns claims foreign priority to Chinese Patent Application No. 202210678538.2, filed on Jun. 15, 2022, the disclosures and content of which are incorporated by reference herein in their entirety.

RELATED FIELD

The present disclosure relates to the technical field of circuit breakers. More specifically, the present disclosure relates to an anti-rebound protection device for a circuit breaker and a circuit breaker comprising the same.

BACKGROUND

A circuit breaker is an electrical device installed in an electric circuit, and can usually be classified into a high-voltage circuit breaker and a low-voltage circuit breaker according to its application scope. Generally, the circuit breaker comprises of a contact system, an arc-extinguishing system, an operating mechanism, a tripping device, and a housing, etc. The electric circuit can be forced to be opened or closed by the circuit breaker in normal use, or the circuit breaker can be used to safely cut off current to protect other electrical equipment in the circuit when fault current or short-circuit current occurs in the circuit.

The contact system of the circuit breaker comprises a moving contact and a stationary contact that can be connected to each other to achieve a closing operation. In a case of, for example, a short-circuit event, the moving contact moves away from the stationary contact to achieve an opening operation. However, extremely high gas pressure may be generated by electric arc in the arc-extinguishing chamber when the circuit breaker cuts off the short-circuit current by the opening operation. If the gas pressure cannot be released in time, a great force may be generated to force the moving contact to rebound at the end of its stroke. When the moving contact rebounds to a certain position, it will cause a secondary electric breakdown between the moving contact and the stationary contact. If it is chosen to increase the release flow of the high-pressure gas, other performances of the circuit breaker may be sacrificed. Therefore, it is of great significance to study the anti-rebound performance of the circuit breaker.

SUMMARY

An object of the present disclosure is to provide an anti-rebound protection device for a circuit breaker and a circuit breaker comprising the same. The anti-rebound protection device can effectively limit the rebound of the moving contact by a mechanical means when opening the circuit breaker, and has a simple structure and low cost.

To this end, a first aspect of the present disclosure provides an anti-rebound protection device for a circuit breaker comprising an operating mechanism. The operating mechanism comprises a housing, a main shaft arranged in the housing, and an output lever connected to the main shaft.

The anti-rebound protection device comprises: a control cam configured to be connected to the main shaft so as to be driven to rotate during closing of the circuit breaker, and to remain stationary during opening of the circuit breaker; a control lever configured to be rotatable relative to the housing, and provided with a first stopper for abutting against the control cam; and a locking mechanism comprising a locking member configured to be rotatably connected to the output lever and a second stopper provided on the control lever. The locking mechanism is configured, during the opening of the circuit breaker, such that a) the locking member is rotated relative to the output lever against the second stopper when the output lever is driven to rotate in a first direction, so as to allow the output lever to keep rotating in the first direction; and b) rotation of the output lever in a second direction opposite to the first direction is limited by interference between the locking member and the second stopper.

According to an alternative embodiment of the present disclosure, the control cam is provided with a recess recessed radially and inwards along its peripheral edge, and the locking mechanism is configured to eliminate the interference between the locking member and the second stopper when the control cam is rotated such that the first stopper abuts against the recess, so as to allow the output lever to rotate in the second direction.

According to an alternative embodiment of the present disclosure, the control lever has a curved shape and is rotatable around a rotation shaft positioned at a center of the control lever.

According to an alternative embodiment of the present disclosure, the first stopper is arranged at a first end of the control lever, and the second stopper is arranged at a second end of the control lever opposite to the first end.

According to an alternative embodiment of the present disclosure, each of the first stopper and the second stopper is a pin shaft.

According to an alternative embodiment of the present disclosure, the locking member is a locking pawl mated with the pin shaft.

According to an alternative embodiment of the present disclosure, the anti-rebound protection device further comprises a first spring configured to enable the first stopper to keep abutting against the control cam.

According to an alternative embodiment of the present disclosure, the anti-rebound protection device further comprises a second spring configured to enable the locking member to abut against the output lever, and to allow the locking member to rotate relative to the output lever against the second stopper.

A second aspect of the present disclosure provides a circuit breaker comprising the anti-rebound protection device for a circuit breaker according to the first aspect of the present disclosure.

The anti-rebound protection device according to the present disclosure has various advantages. Specifically, the anti-rebound protection device is an independent unit comprising of the control cam, the control lever and the locking mechanism, etc., therefore can be assembled outside the body of the operating mechanism; during the opening operation of the circuit breaker, the rebound of the moving contact can be blocked by the locking mechanism, while during the closing operation of the circuit breaker, the rotation of the control cam allows the locking mechanism to eliminate the locking, such that the output lever of the operating mechanism can pass therethrough without interference. In view of the above, the anti-rebound protection device has a simple structure, is convenient to assemble and has low cost, and can limit the rebound value of the moving contact to be less than a required value by a mechanical means, therefore can be widely used in various types of circuit breakers, especially in high-voltage circuit breakers.

BRIEF DESCRIPTION OF THE DRAWINGS

Other features and advantages of the present disclosure will be better understood through the following embodiments described in detail with reference to the accompanying drawings, in which a same reference numeral indicates a same or similar component.

Figure 1:
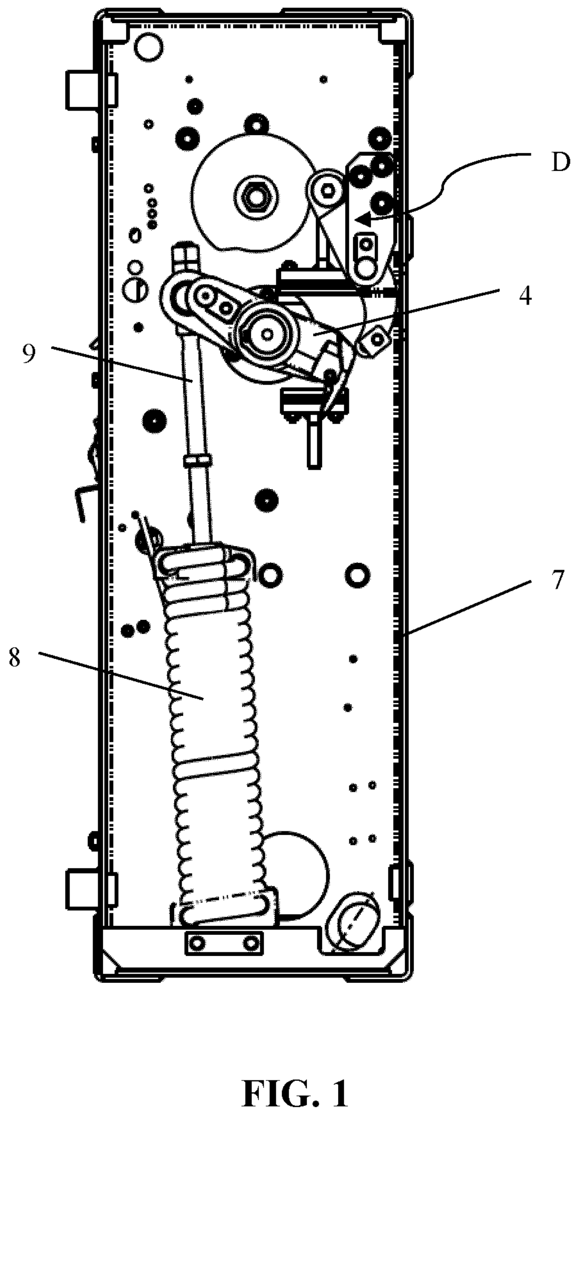
FIG. 1 is a side view of an operating mechanism of a circuit breaker according to an embodiment of the present disclosure.

It should be noted that these drawings are not only used to explain the present disclosure, but also help to define the present disclosure when necessary.

DETAILED DESCRIPTION

The implementation and usage of the embodiments are discussed in detail below. However, it is conceivable that these specific embodiments discussed herein are merely intended to illustrate specific ways of implementing and using the present disclosure, and are not intended to limit the scope of protection of the present disclosure.

In the specification, when describing the structures and positions of the components, directional expressions, such as “upper”, “lower”, “clockwise”, and “anticlockwise”, are not absolute, but relative. When the components are arranged as shown in the drawings, these directional expressions are appropriate, but when the positions of these components in the drawings are altered, these directional expressions should be altered accordingly.

In addition, in the specification, the terms, such as “mounted to” and “connected to”, should be understood in a broad sense unless otherwise specified and defined. For example, “connected to” may be “fixedly connected to”, “detachably connected to” or “integrally connected to”, may be “mechanically connected to” or “electrically connected to”, and may be “directly connected to”, “indirectly connected to” or “associated with (something) under some effect”. For those skilled in the art, the specific meanings of the above terms in the specification can be understood according to specific circumstances.

FIG. 1 is a side view of an operating mechanism of a circuit breaker according to an embodiment of the present disclosure (seeing from an opening mechanism). As shown in FIG. 1, the operating mechanism of the circuit breaker comprises: a housing 7; a main shaft (not shown) arranged in the housing 7; an output lever 4 connected to the main shaft and adapted to rotate around a central rotation shaft 41 clockwise or anticlockwise; and a push lever 9 rotatably connected to the output lever 4. The lower end of the push lever 9 is connected to an opening spring 8, and the upper end of the push lever 9 is connected to a moving contact (not shown) of the circuit breaker.

During the closing of the circuit breaker, the output lever 4 is driven to rotate in a first direction (that is, the clockwise direction shown in the drawings) so as to drive the push lever 9 to move upwards, such that the moving contact and a stationary contact are connected to each other, and the opening spring 8 is stretched. During the opening of the circuit breaker, the opening spring 8 pulls the push lever 9 to move downwards, such that the moving contact and the stationary contact are separated from each other, and the output lever 4 is driven to rotate in a second direction (that is, the anticlockwise direction shown in the drawings) opposite to the first direction.

Figure 2A:
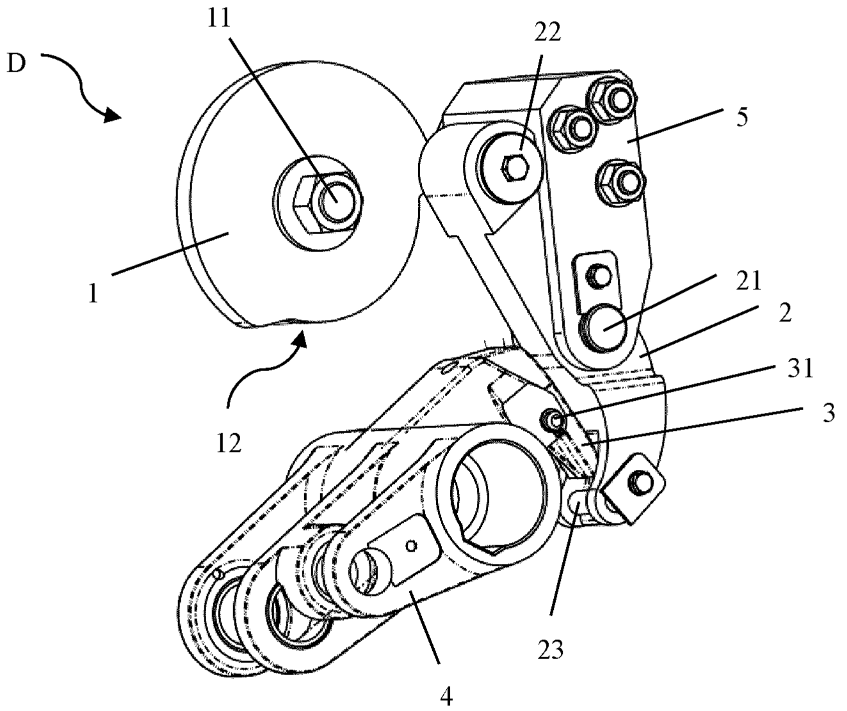
FIG. 2A is a perspective view of an anti-rebound protection device of the circuit breaker.
Figure 2B:
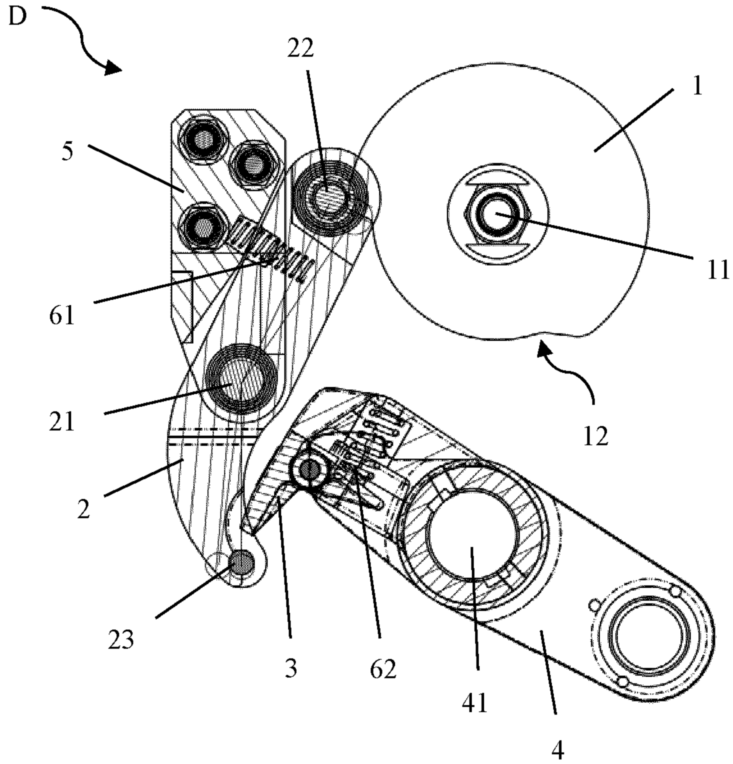
FIG. 2B is a cross-sectional view of the anti-rebound protection device of the circuit breaker.

In order to limit the rebound of the moving contact during the opening operation, the circuit breaker of the present disclosure is provided with an anti-rebound protection device D associated with the operating mechanism. FIG. 2A is a perspective view of the anti-rebound protection device D, and FIG. 2B is a cross-sectional view of the anti-rebound protection device D. As shown in FIG. 2A and FIG. 2B, the anti-rebound protection device D mainly comprises a control cam 1, a control lever 2, and a locking mechanism comprising two stoppers.

The control cam 1 is connected to the main shaft via its central rotation shaft 11, so as to be driven to rotate during the closing of the circuit breaker, and to remain stationary during the opening of the circuit breaker. The control cam 1 is provided with a recess 12 recessed radially and inwards along its peripheral edge. That is, the peripheral edge of the control cam 1 has a first radial dimension at the positions other than the recess 12, and has a second radial dimension less than the first radial dimension at the recess 12.

The control lever 2 has a curved shape and is rotatable around a rotation shaft 21 positioned substantially at the center of the control lever 2. The rotation shaft 21 may be arranged, for example, on a support 5 mounted to the housing 7. Therefore, the control lever 2 is arranged to be rotatable relative to the housing 7. The upper end of the control lever 2 is provided with a first stopper, such as a first pin shaft 22, and the lower end of the control lever 2 that is bent towards the output lever 4 is provided with a second stopper, such as a second pin shaft 23. A first spring 61 is arranged between the support 5 and the control lever 2 to enable the first pin shaft 22 to keep abutting against the peripheral edge of the control cam 1 at all times. When the control cam 1 is driven to rotate, the first pin shaft 22 slides on the peripheral edge of the control cam 1, and the variation of the radial dimension of the peripheral edge drives the control lever 2 to rotate around its rotation shaft 21.

The locking mechanism comprises the second pin shaft 23 and a locking member rotatably connected to the output lever 4. The locking member is, for example, a locking pawl 3 mated with the second pin shaft 23, as shown in the drawings. A second spring 62 is arranged between the output lever 4 and the locking pawl 3, so as to enable the locking pawl 3 to abut against the output lever 4, and to allow the locking pawl 3 to rotate relative to the output lever 4 around a rotation shaft 31 arranged on the output lever 4 by overcoming the elastic force of the second spring 62 when the locking pawl 3 is subjected to other external forces.

FIG. 3A to FIG. 3D sequentially show the changes of the position of the anti-rebound protection device D during the opening operation of the circuit breaker. During the opening operation, the control cam 1 keeps stationary, and the first pin shaft 22 arranged at the upper end of the control lever 2 keeps at all times abutting against the portion of the peripheral edge of the control cam 1 with the first radial dimension under the effect of the first spring 61. Therefore, the control lever 2 also keeps stationary during the opening operation of the circuit breaker.

Figure 3A:
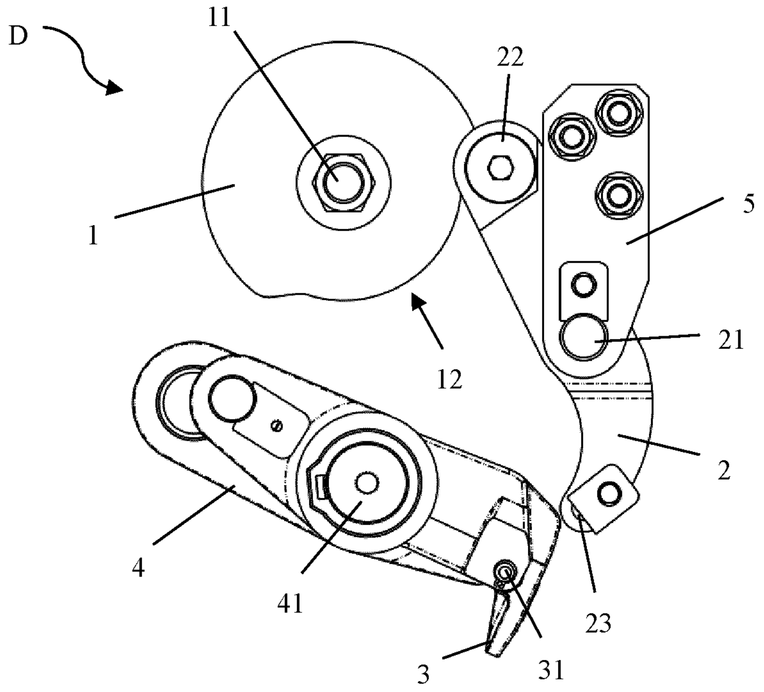
FIG. 3A to FIG. 3D are schematic views showing the changes of the position of the anti-rebound protection device during an opening operation of the circuit breaker.
Figure 3B:
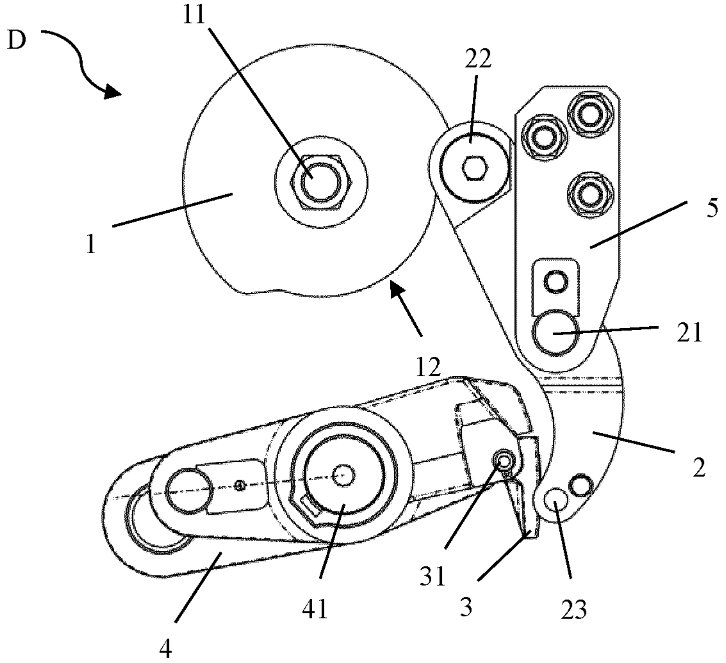
Figure 3C:
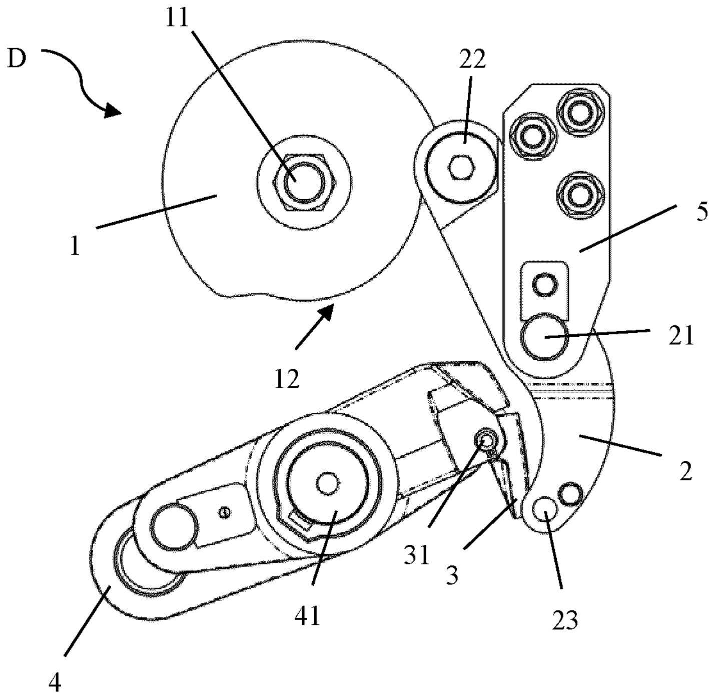

During the opening operation, the output lever 4 is driven to rotate anticlockwise from the initial position shown in FIG. 3A, and the locking pawl 3 keeps abutting against the output lever 4 under the effect of the second spring 62 until it is blocked by the second pin shaft 23 arranged at the lower end of the control lever 2 at the position shown in FIG. 3B. Due to this blocking, the locking pawl 3 is capable of overcoming the elastic force of the second spring 62 and rotating relative to the output lever 4 around the rotation shaft 31 against the second pin shaft 23, such that the locking pawl 3 and the output lever 4 are separated at the position where they abut against each other. This relative rotation allows the output lever 4 to keep rotating anticlockwise until the locking pawl 3 is separated from the second pin shaft 23 after passing through the position shown in FIG. 3C. Then, the locking pawl 3 abuts again against the output lever 4 under the effect of the second spring 62, and rotates with the output lever 4 to the extreme position shown in FIG. 3D.

Figure 3D:
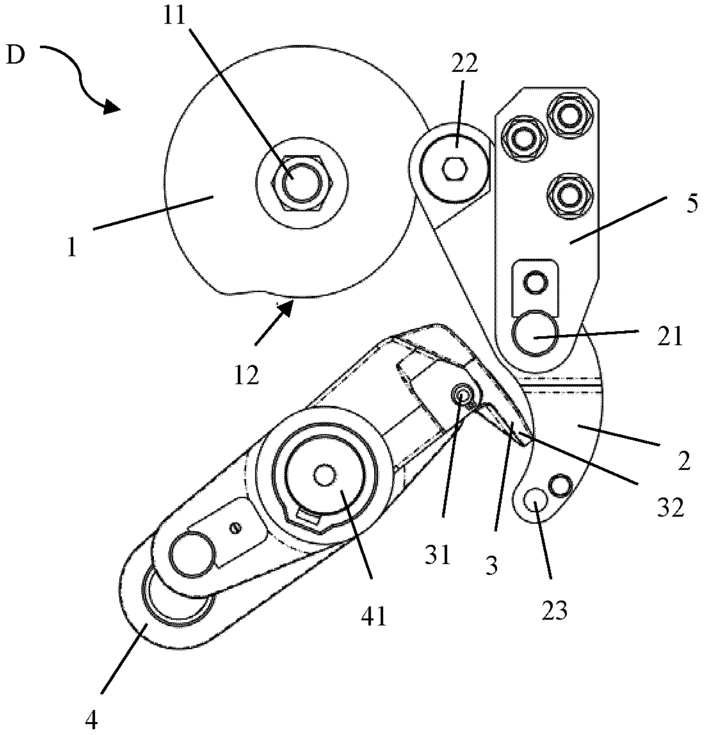

In case of the rebound of the moving contact, the output lever 4 is driven to rotate clockwise from the extreme position shown in FIG. 3D. In this case, the locking mechanism enables the tip 32 of the locking pawl 3 to be blocked by the second pin shaft 23 having a sufficient blocking strength, such that the output lever 4 is not capable of keep rotating clockwise. Therefore, the rebound value of the moving contact can be limited to be less than a required value to avoid a secondary electric breakdown between the moving contact and the stationary contact. It is conceivable that the allowable rebound value can be determined by adjusting the shape, position, dimension and other parameters of the control lever 2, the second pin shaft 23, the locking pawl 3 and other components by those skilled in the art according to actual needs, and is not limited by the present disclosure.

FIG. 4A to FIG. 4E sequentially show the changes of the position of the anti-rebound protection device D during the closing operation of the circuit breaker. During the closing operation, from the initial position shown in FIG. 4A, the control cam 1 is driven by the main shaft to rotate anticlockwise and the output lever 4 is driven to rotate clockwise (FIG. 4C corresponds to the back of FIG. 4B, thus the directional expressions are opposite). When the control cam 1 is rotated to the position shown in FIG. 4B and FIG. 4C, the control lever 2 rotates anticlockwise around its rotation shaft 21 under the effect of the first spring 61, such that the first pin shaft 22 arranged at the upper end of the control lever 2 abuts against the recess 12 of the control cam 1, that is, abuts against the portion of the peripheral edge of the control cam 1 with the second radial dimension. Due to the anticlockwise rotation of the control lever 2, the tip 32 of the locking pawl 3 will not be blocked by the second pin shaft 23 arranged at the lower end of the control lever 2 when it rotates clockwise with the output lever 4, and the locking/interference between the locking pawl 3 and the second pin shaft 23 is thus eliminated, therefore allowing the output lever 4 to keep rotating clockwise until it reaches the closing position shown in FIG. 4D and FIG. 4E.

Figure 4A:
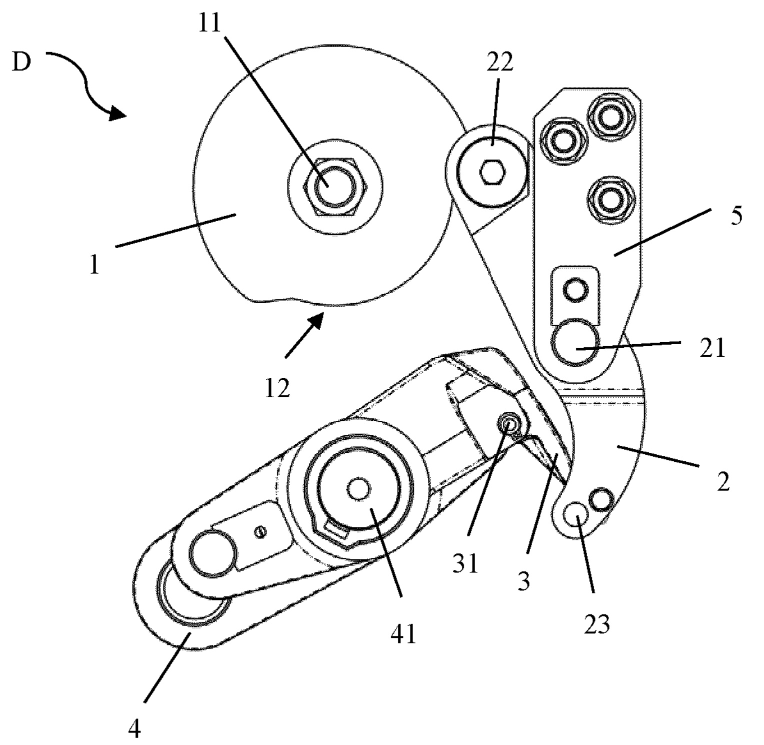
FIG. 4A to FIG. 4E are schematic views showing the changes of the position of the anti-rebound protection device during a closing operation of the circuit breaker.
Figure 4B:
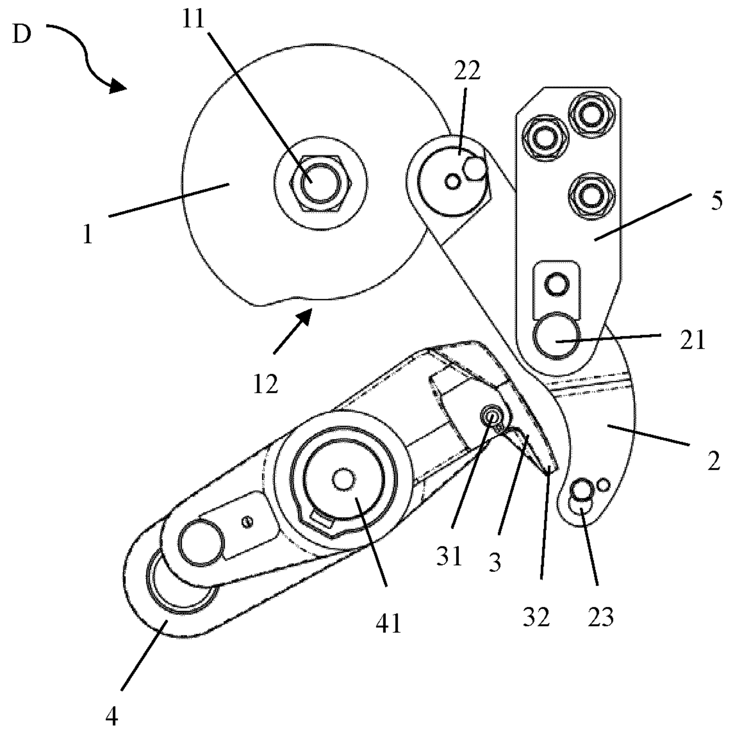
Figure 4C:
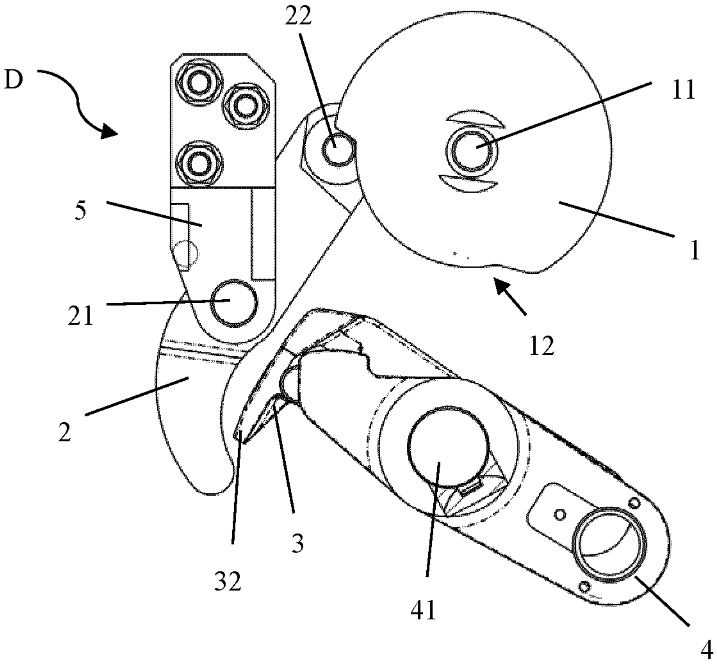
Figure 4D:
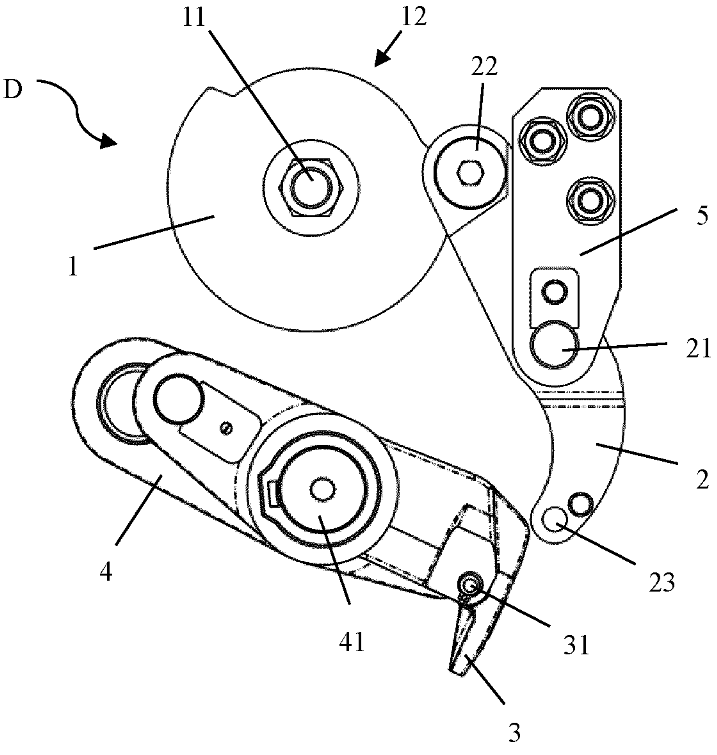
Figure 4E:
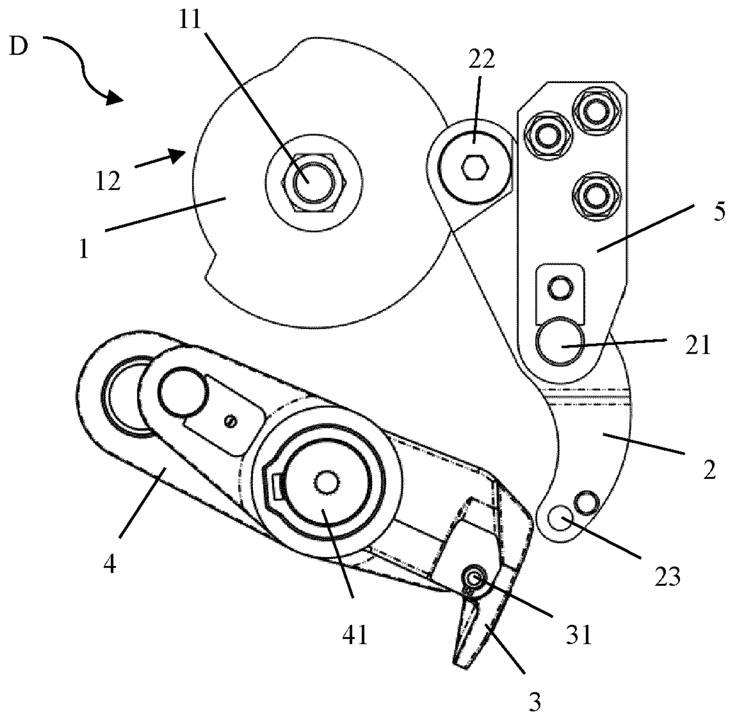

It can be noted that, the control cam 1 can be driven to rotate only in the anticlockwise direction, and when the control cam 1 is rotated to the position shown in FIG. 4D, the control cam 1 allows the control lever 2 to rotate clockwise around its rotation shaft 21, such that the first pin shaft 22 leaves the recess 12 and abuts again against the portion of the peripheral edge of the control cam 1 with the first radial dimension. After the control cam 1 is rotated to the position shown in FIG. 4E, the control cam 1 is capable of keeping rotating anticlockwise during energy storage of a closing spring of the operating mechanism until it returns to the initial position shown in FIG. 4A.

Various technical contents and features of the present disclosure have been disclosed above. However, it is conceivable that those skilled in the art can make various changes and improvements to the above-disclosed subject matter under the creative concept of the present disclosure, and all these various changes and improvements fall within the protection scope of the present disclosure.

The description of the above embodiments is exemplary rather than limitative, and the protection scope of the present disclosure is defined by the appended claims.

The invention claimed is:

1. An anti-rebound protection device for a circuit breaker comprising an operating mechanism, the operating mechanism comprising a housing, a main shaft arranged in the housing, and an output lever connected to the main shaft;

wherein the anti-rebound protection device comprises:

a control cam configured to be connected to the main shaft so as to be driven to rotate during closing of the circuit breaker, and to remain stationary during opening of the circuit breaker;

a control lever configured to be rotatable relative to the housing, and provided with a first stopper for abutting against the control cam; and a locking mechanism comprising a locking member configured to be rotatably connected to the output lever and a second stopper provided on the control lever, and wherein the locking mechanism is configured, during the opening of the circuit breaker, such that:

a) the locking member is rotated relative to the output lever against the second stopper when the output lever is driven to rotate in a first direction, so as to allow the output lever to keep rotating in the first direction;

b) rotation of the output lever in a second direction opposite to the first direction is limited by interference between the locking member and the second stopper.

2. The anti-rebound protection device according to claim 1, wherein the control cam is provided with a recess recessed radially and inwards along its peripheral edge, and wherein the locking mechanism is configured to eliminate the interference between the locking member and the second stopper when the control cam is rotated such that the first stopper abuts against the recess, so as to allow the output lever to rotate in the second direction.

3. The anti-rebound protection device according to claim 1, wherein the control lever has a curved shape and is rotatable around a rotation shaft positioned at a center of the control lever.

4. The anti-rebound protection device according to claim 3, wherein the first stopper is arranged at a first end of the control lever, and wherein the second stopper is arranged at a second end of the control lever opposite to the first end.

5. The anti-rebound protection device according to claim 1, wherein each of the first stopper and the second stopper is a pin shaft.

6. The anti-rebound protection device according to claim 5, wherein the locking member is a locking pawl mated with the pin shaft.

7. The anti-rebound protection device according to claim 1, wherein the anti-rebound protection device further comprises a first spring configured to enable the first stopper to keep abutting against the control cam.

8. The anti-rebound protection device according to claim 1, wherein the anti-rebound protection device further comprises a second spring configured to enable the locking member to abut against the output lever, and to allow the locking member to rotate relative to the output lever against the second stopper.

9. A circuit breaker comprising the anti-rebound protection device according to claim 1.

* * * * *